(12) United States Patent
Oki (10) Patent No.: US 10,510,163 B2
(45) Date of Patent: Dec. 17, 2019

(54) IMAGE PROCESSING APPARATUS AND IMAGE PROCESSING METHOD

(71) Applicant: Kabushiki Kaisha Toshiba, Minato-ku, Tokyo (JP)

(72) Inventor: Yutaka Oki, Ome Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 15/686,442

(22) Filed: Aug. 25, 2017

(65) Prior Publication Data
US 2018/0204351 A1 Jul. 19, 2018

(30) Foreign Application Priority Data

Jan. 13, 2017 (JP) .................................. 2017-004522

(51) Int. Cl.
*G06T 7/80* (2017.01)
*G06K 9/62* (2006.01)
(Continued)

(52) U.S. Cl.
CPC .............. *G06T 7/85* (2017.01); *G06K 9/6202* (2013.01); *G06T 7/593* (2017.01); *H04N 13/239* (2018.05);
(Continued)

(58) Field of Classification Search
CPC .............. G06T 7/85; G06T 2207/10012; G06T 1/0007; G06T 2207/10021;
(Continued)

(56) References Cited

U.S. PATENT DOCUMENTS

| 7,957,581 B2 * | 6/2011 | Wu ........................ G06T 7/593 348/187 |
| 8,867,826 B2 * | 10/2014 | Rzeszutek ............... G06T 7/593 382/154 |

(Continued)

FOREIGN PATENT DOCUMENTS

| DE | 102014221074 A1 | 4/2016 |
| JP | 2004-354257 A | 12/2004 |

(Continued)

OTHER PUBLICATIONS

Stephen DiVerdi et al., "Geometric Calibration for Mobile, Stereo, Autofocus Cameras", IEEE Winter Conference of Applications of Computer Vision (WACV), 8 pages, (Mar. 2016).

(Continued)

*Primary Examiner* — Aklilu K Woldemariam
(74) *Attorney, Agent, or Firm* — White & Case LLP (57) ABSTRACT

According to an embodiment, an image processing apparatus includes a matching unit configured to perform stereo matching processing on two images obtained through imaging using two cameras, an error map creating unit configured to create an error map indicating a displacement amount of the two images in a direction orthogonal to a search line for the two images subjected to the stereo matching processing, and a parallelization parameter error determining unit configured to determine whether or not there is an error of rectification which parallelizes the two images, based on the error map.

9 Claims, 6 Drawing Sheets

(51) Int. Cl.
*G06T 7/593* (2017.01)
*H04N 13/246* (2018.01)
*H04N 13/239* (2018.01)
*H04N 13/00* (2018.01)

(52) U.S. Cl.
CPC . *H04N 13/246* (2018.05); *G06T 2207/10012* (2013.01); *H04N 2013/0081* (2013.01)

(58) Field of Classification Search
CPC . G06T 2207/10024; G06T 2207/10028; G06T 2207/10068; G06T 2207/30028; G06T 2207/30092; G06T 2207/30256; G06T 2207/30261; G06T 5/00; G06T 5/001; G06T 5/006; G06T 7/0012; G06T 7/64; G06T 2207/30244; G06T 7/002; G06T 2207/20016; G06T 7/0075; G06T 7/593; G06T 2207/10152; G06T 7/11; G06T 7/194; G06T 2207/20021; G06T 2207/20072; G06T 2207/30252; G06T 2207/20144; G06T 7/0081; G06T 7/60; G06T 7/74; G06T 15/205; G06T 2207/10016; G06T 2207/10048; G06T 2207/20081; G06T 2207/20084; G06T 2207/20216; G06T 2207/30236; G06T 5/003; G06T 5/50; G06T 7/62; G06T 2207/30208; G06T 7/80; G06T 3/0093; H04N 13/246; H04N 17/002; H04N 13/239; H04N 2013/0081; H04N 13/128; H04N 13/271; H04N 2213/001; H04N 13/0239; H04N 13/0246; H04N 13/0022; H04N 13/243; H04N 13/0425; H04N 13/327; H04N 2013/0092; H04N 5/2256; H04N 5/3532; H04N 13/0203; H04N 13/0296; H04N 13/204; H04N 13/296; H04N 13/0011; H04N 13/0018; H04N 13/111; H04N 5/232; H04N 5/2351; H04N 5/247; G01B 11/14; G01B 11/00; G01B 11/2545; G01B 11/02; G01B 11/24; G01B 11/27; A61B 1/00009; A61B 1/04; A61B 1/05; A61B 1/07; G06K 2009/4666; G06K 2209/053; G06K 2209/057; G06K 9/00791; G06K 9/209; G06K 9/46; G06K 9/4604; G06K 9/4652; G06K 9/468; G06K 9/52; G06K 9/6215; G06K 9/6267; G06K 9/627; G06K 9/00; G06K 9/6202; G06K 9/00785; G06K 2209/40; G06K 9/03; G06K 9/20; B60R 1/00; B60R 2300/107; B60R 2300/303; H01J 2237/2611; H01J 37/26; G01C 11/02; G01C 3/06; G01C 3/10; C12Q 1/6869; C12Q 2535/122; C12Q 2537/165; G06F 19/22
USPC ........ 382/106, 154, 254; 348/7, 42, 51, 135, 348/43, 44, 47
See application file for complete search history.

(56) References Cited

U.S. PATENT DOCUMENTS

| | | | |
|---|---|---|---|
| 2003/0156751 A1* | 8/2003 | Lee | G06K 9/03 382/154 |
| 2004/0240725 A1* | 12/2004 | Xu | G06K 9/32 382/154 |
| 2005/0237385 A1* | 10/2005 | Kosaka | G01B 11/00 348/42 |
| 2008/0158340 A1* | 7/2008 | Shibata | H04N 7/144 348/14.16 |
| 2010/0020178 A1* | 1/2010 | Kleihorst | G06T 7/85 348/175 |
| 2010/0134599 A1* | 6/2010 | Billert | H04N 13/395 348/48 |
| 2010/0329543 A1* | 12/2010 | Li | G06T 3/0068 382/154 |
| 2013/0147948 A1* | 6/2013 | Higuchi | H04N 17/002 348/135 |
| 2013/0222556 A1* | 8/2013 | Shimada | G06T 7/85 348/50 |
| 2013/0329019 A1* | 12/2013 | Matsuoka | H04N 13/218 348/49 |
| 2014/0043447 A1 | 2/2014 | Huang et al. | |
| 2014/0049612 A1* | 2/2014 | Ishii | G01B 11/00 348/46 |
| 2014/0125771 A1 | 5/2014 | Grossmann et al. | |
| 2015/0036917 A1* | 2/2015 | Nanri | G06T 5/20 382/154 |
| 2015/0124059 A1* | 5/2015 | Georgiev | H04N 13/246 348/47 |
| 2015/0138389 A1* | 5/2015 | Mishra | G06K 9/46 348/222.1 |
| 2015/0213607 A1* | 7/2015 | Jeong | G06T 7/97 345/427 |
| 2015/0249814 A1* | 9/2015 | Nanri | G01B 11/026 348/46 |
| 2015/0339817 A1 | 11/2015 | Kuriyama | |
| 2017/0201736 A1 | 7/2017 | Ishimaru et al. | |
| 2017/0287166 A1* | 10/2017 | Claveau | G06T 7/80 |

FOREIGN PATENT DOCUMENTS

| | | |
|---|---|---|
| JP | 2012-075060 A | 4/2012 |
| JP | 2013-113600 A | 6/2013 |
| JP | 2014-166298 A | 9/2014 |
| WO | 2015198930 A1 | 12/2015 |
| WO | 2016054089 A1 | 4/2016 |
| WO | 2016-203989 A1 | 12/2016 |

OTHER PUBLICATIONS

Andrea Fusiello et al., "A Compact Algorithm for Rectification of Stereo Pairs", Machine Vision and Applications, pp. 1-6, (Jul. 2000).
Extended European Search Report dated Mar. 6, 2018 in corresponding European Patent Application No. 17187941.4.
Japanese Office Action dated Aug. 20, 2019 in corresponding Japanese Patent Application No. 2017-004522, along with English Translation.

* cited by examiner

IMAGE PROCESSING APPARATUS AND IMAGE PROCESSING METHOD

CROSS-REFERENCE TO RELATED APPLICATION

This application is based upon and claims the benefit of priority from the prior Japanese Patent Application No. 2017-004522 filed in Japan on Jan. 13, 2017; the entire contents of which are incorporated herein by reference.

FIELD

An embodiment described herein relates generally to an image processing apparatus and an image processing method.

BACKGROUND

Conventionally, there is a technology of obtaining points which correspond among a plurality images acquired using two or more cameras (hereinafter referred to as corresponding points) and measuring a three-dimensional position of a subject from a positional relationship among the cameras and positions of the corresponding points on the respective images. This technology is utilized in various fields such as an in-vehicle advanced driver assistance system, a mobile device and a game machine. Particularly, a stereo camera system (hereinafter also referred to as a stereo camera) using two cameras is widely utilized.

For example, because a search range can be narrowed down in one dimension and corresponding points can be efficiently searched by the corresponding points being searched according to epipolar constraint conditions, in most stereo cameras, the corresponding points are searched according to the epipolar constraint conditions.

A rectification circuit parallelizes two images obtained with two cameras so that a point on one image exists on a search line such as an epipolar line on the other image. A parameter for parallelizing the two images is provided at the rectification circuit. This parameter is, for example, determined through calibration using an adjusting apparatus, or the like, upon manufacturing of the stereo camera.

However, there is a case where the parameter is displaced and becomes inappropriate due to temperature characteristics or vibration characteristics of a jig, or the like, of the adjusting apparatus, aging degradation of the stereo camera, or the like.

To modify such displacement, conventionally, characteristic points or characteristic regions on two images are calculated, and non-linear optimization processing, or the like, is performed using a corresponding point pair. There is a problem that it takes time to determine whether or not there is a parameter error for rectification, and, as a result, it takes time to perform processing of correcting the parameter error.

DETAILED DESCRIPTION

An image processing apparatus of an embodiment includes a matching unit configured to perform stereo matching processing on a first image and a second image, a displacement amount information creating unit configured to create displacement amount information of the images in a direction orthogonal to a search line for the images subjected to the stereo matching processing, and a rectification error determining unit configured to determine whether or not there is an error of rectification which parallelizes the images based on the displacement amount information.

Figure 1:
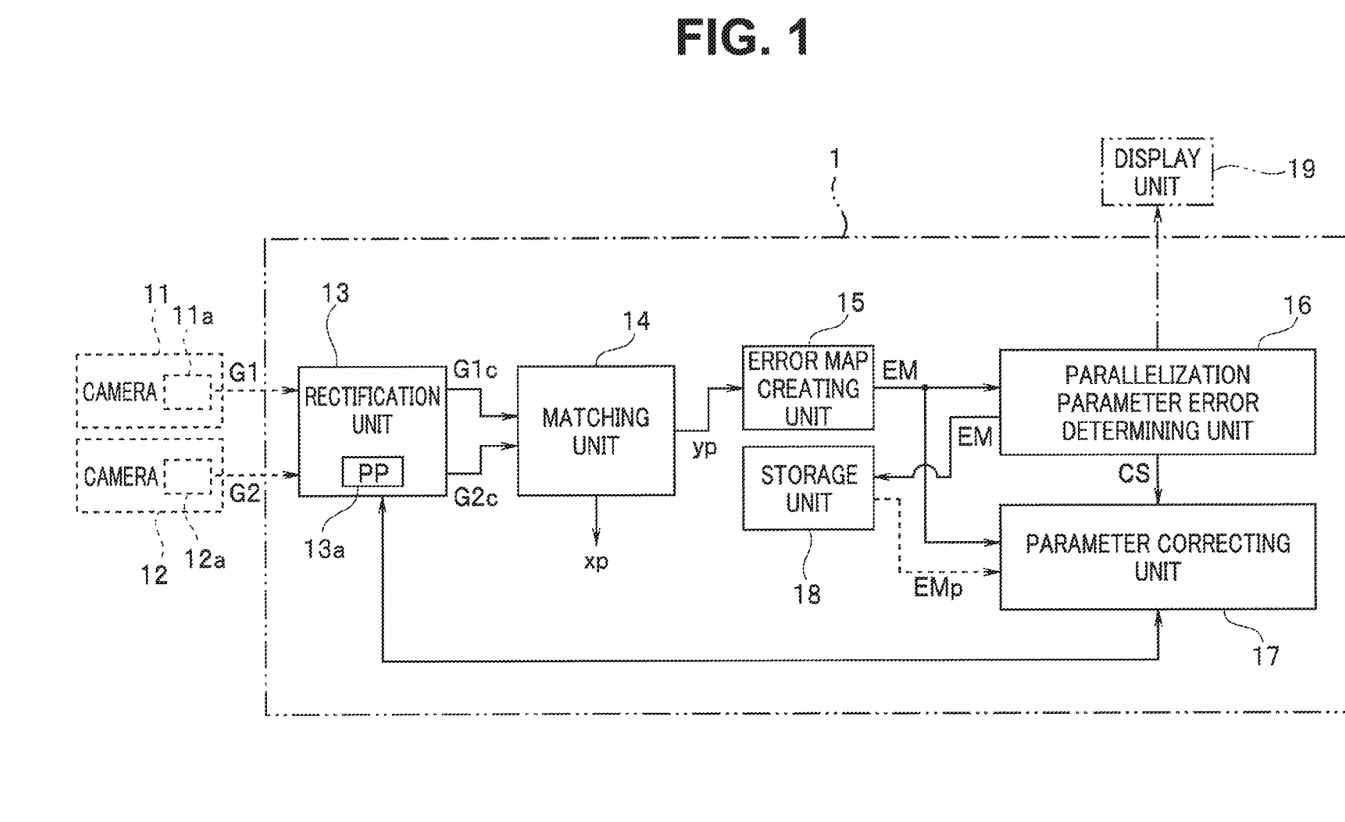
FIG. 1 is a block diagram of an image processing apparatus according to an embodiment.

The embodiment will be described below with reference to the drawings.
(Configuration)
FIG. 1 is a block diagram of the image processing apparatus according to the present embodiment.

The image processing apparatus 1 includes a rectification unit 13 configured to receive image signals from two cameras 11 and 12, a matching unit 14, an error map creating unit 15, a parallelization parameter error determining unit 16, a parameter correcting unit 17 and a storage unit 18. The image processing apparatus 1 is a semiconductor apparatus including a circuit such as the matching unit 14.

Note that the storage unit 18 may be a semiconductor apparatus (for example, a DRAM) different from the semiconductor apparatus including the matching unit 14, or the like.

Still further, the rectification unit 13 may be a semiconductor apparatus different from the semiconductor apparatus including the matching unit 14, or the like.

The cameras 11 and 12 indicated with dotted line in FIG. 1, which are part of a stereo camera system, are disposed separately from each other so that stereo measurement can be performed from two images. The cameras 11 and 12 respectively have, for example, CMOS image sensors 11a and 12a as image pickup devices.

The rectification unit 13 is a circuit which holds parallelization parameter information PP and performs parallelization processing on images G1 and G2 based on the parallelization parameter information PP. The parallelization parameter information PP is held at a register 13a of the rectification unit 13.

More specifically, the parallelization parameter information PP is set upon calibration during manufacturing of a stereo camera. The rectification unit 13 modifies both or one of the images G1 and G2 so that two epipolar lines are parallel to an X axis on the images G1 and G2 and the corresponding epipolar lines are located on the same y coordinate. By limiting a search range of the corresponding points on the epipolar lines by utilizing such epipolar constraint, the processing amount and a probability of error matching are reduced.

That is, the rectification unit 13 performs parallelization processing on one or both of the images G1 and G2 based on the parallelization parameter information PP set upon calibration so that a point of one image exists on an epipolar line on the other image. The parallelization parameter information PP is formed with correction data for each pixel or for each block region for performing at least one of rotation and parallel movement of one or both of the images G1 and G2.

Further, the rectification unit 13 has a function of updating the parallelization parameter information PP using a correction signal.

The rectification unit 13, for example, selects a table indicating a correspondence relationship between an input pixel and an output pixel according to the parallelization parameter information PP and performs image conversion on both or one of the images G1 and G2 using the table. The image conversion includes homography conversion.

Note that the image conversion may be performed using a conversion equation, in which case a parameter in the conversion expression is changed based on calibration information.

Still further, filtering processing may be performed on each image data after the image conversion processing.

The rectification unit 13 outputs image signals of images G1$c$ and G2$c$ subjected to parallelization processing to the matching unit 14.

The matching unit 14 is a circuit which executes stereo matching processing for determining which position on the other image each pixel on one image is located and outputs disparity information. That is, the matching unit 14 performs stereo matching processing on two images obtained through imaging using the cameras 11 and 12.

More specifically, the matching unit 14 calculates a degree of matching with a corresponding pixel or a corresponding block for each pixel on one image while moving a search window including a plurality of lines on the other image. The matching unit 14 outputs disparity information (hereinafter referred to as x disparity) xp in an x direction and disparity information (hereinafter referred to as y disparity) yp in a y direction of each pixel from the calculated degree of matching. The x disparity xp and the y disparity yp are indicated with, for example, the number of pixels.

Note that the matching unit 14 may output disparity information for each block formed with a predetermined plurality of pixels, for example, nine pixels of three rows and three columns in place of disparity information for each pixel.

Figure 2:
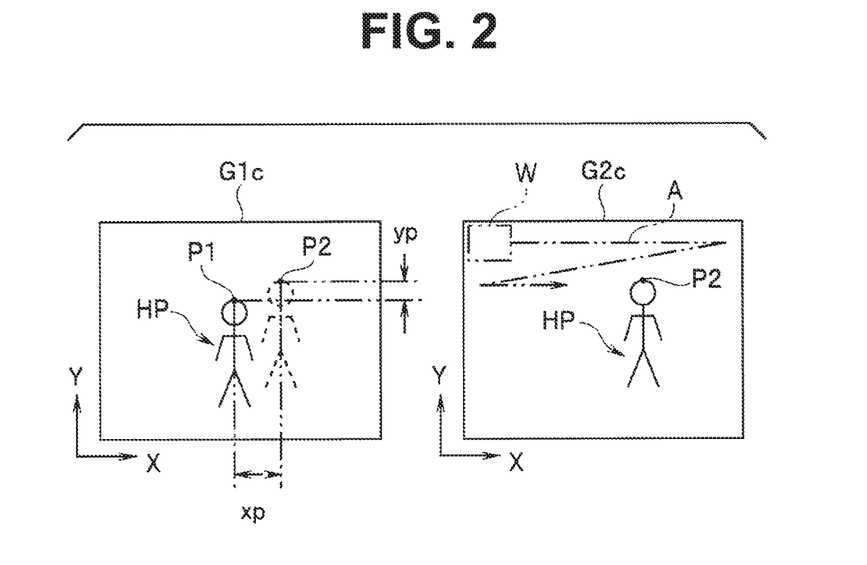
FIG. 2 is a diagram for explaining disparity between two images according to the embodiment.

The x disparity and the y disparity will be described using FIG. 2. FIG. 2 is a diagram for explaining disparity between two images.

The image G1$c$ is an image obtained by performing parallelization processing on the image G1, and the image G2$c$ is an image obtained by performing parallelization processing on the image G2.

As indicated with an arrow A, the matching unit 14 performs stereo matching processing of calculating a degree of matching of each pixel in the image G1$c$ while moving a block (or a window) W of a predetermined size in an X direction in the image G2$c$, and when movement in the X direction is finished, changing the line to the next line and moving the block W in the X direction. The matching unit 14 calculates a degree of matching in the image G2$c$ for all the pixels in the image G1$c$. The block W of a predetermined size has a length corresponding to a plurality of pixels in an x direction and a y direction, and, for example, the block W is formed with pixels of k×m. k and m are positive integers.

Therefore, the matching unit 14 not only scans lines which pass the same y coordinate as a coordinate of a certain pixel in one image and which are parallel to the x axis in the other image, but also scans several lines over and below the lines included in the block W and calculates the x disparity xp and the y disparity yp of the obtained corresponding points.

Figure 3:
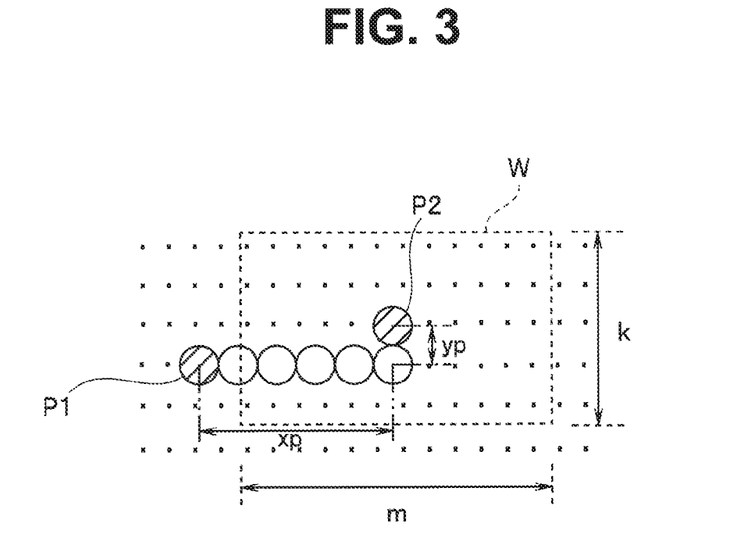
FIG. 3 is a diagram for explaining x disparity xp and y disparity yp obtained through stereo matching processing according to the embodiment.

FIG. 3 is a diagram for explaining the x disparity xp and the y disparity yp obtained through stereo matching processing.

The block W is a block of k×m, and within the block W, a corresponding point of a point (pixel) in one of the two images is detected through stereo matching processing. FIG. 3 indicates a point P1 in one image and a corresponding point P2 in the other image with diagonal line.

FIG. 3 indicates that the corresponding point P2 is located at a position of "+1" pixel in a Y direction and "+5" pixel in an X direction with respect to the point P1. In FIG. 3, the x disparity xp is "+5" and the y disparity yp is "+1".

The y disparity yp indicates a displacement amount of two images in a direction orthogonal to the epipolar line which is a search line for the two images. That is, the displacement amount is a value of disparity for each pixel in one image with respect to the corresponding pixel in the other image.

Note that, while the search line is parallel to the X axis, and the displacement amount is a displacement amount in the Y axis direction orthogonal to the epipolar line here, the search line does not have to be parallel to the X axis.

Therefore, the matching unit 14 calculates a degree of matching between pixels in the image G1$c$ and in the image G2$c$, determines a pixel with a high degree of matching, and calculates and outputs the x disparity xp and the y disparity yp for the determined pixel. As a result, the x disparity xp and the y disparity yp in the image G2$c$ are output for each pixel of the image G1$c$ from the matching unit 14.

For example, as illustrated in FIG. 2, a point P1 of a person HP in the image G1$c$ is displaced from a point P2 of a person HP in the image G2$c$ by the x disparity xp in the X direction and the y disparity yp in the Y direction.

Information of the x disparity xp output from the matching unit 14 is supplied to other circuits (which are not illustrated) for measuring a distance. When calibration is correctly performed, it is possible to obtain accurate distance information of each pixel using the information of the x disparity xp.

As described above, because the matching unit 14 calculates the y disparity yp as well as the x disparity xp in the stereo matching processing using the block W, an error map is created using the y disparity yp.

Information of the y disparity yp is supplied to the error map creating unit 15.

The error map creating unit 15 is a circuit which creates an error map using the y disparity yp. The error map creating unit 15 outputs information of the created error map to the parallelization parameter error determining unit 16 and the parameter correcting unit 17.

The error map M is created by disposing data of the y disparity yp at a pixel position of the x disparity xp on an X-Y plane. The error map M is a map indicating a displacement amount in the Y direction, that is, the y disparity yp of the corresponding pixel in the image G2$c$ with respect to each pixel on the line in the image G1$c$.

For example, the error map M is a map indicating a displacement amount in the Y direction, that is, the y disparity yp of a position of the corresponding pixel in the image G2$c$ (position having the x disparity xp and the y disparity yp) with respect to each pixel on the line in the image G1c. In the case of the example in FIG. 3, a value of the y disparity yp of the point P2 is disposed at a pixel position of the point P1.

Figure 4:
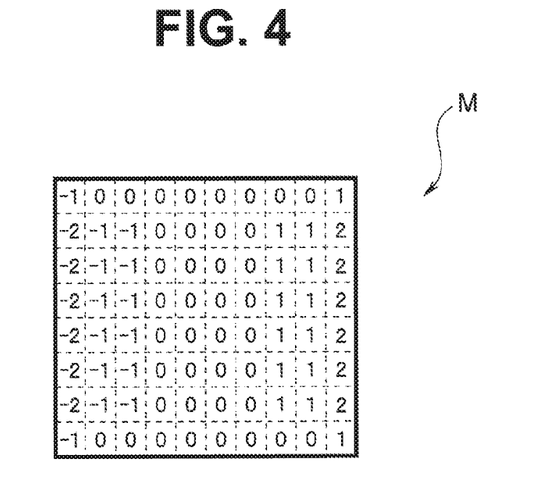
FIG. 4 is a diagram illustrating an example of an error map according to the embodiment.

FIG. 4 is a diagram illustrating an example of the error map. Note that FIG. 4 illustrates an error map of 8×10 pixels for simplicity. In the error map M in FIG. 4, the y disparity yp has a value of a range from "−2" to "+2". "−2" indicates that the corresponding point in the image G2c is located at a position displaced in the Y direction by −2 pixels, in other words, a position going down by two pixels.

"+1" indicates that the corresponding point in the image G2c is located at a position displaced by +1 pixel in the Y direction, in other words, a position going up by one pixel.

"0" indicates that the corresponding point in the image G2c is not displaced in the Y direction.

Note that, while there is a pixel where the corresponding point does not exist in peripheral parts of the images G1c and G2c, in this case, processing such as processing of using a value of the y disparity yp of a pixel in the vicinity as a value of the y disparity yp of the pixel where the corresponding point does not exist and processing of filling the pixel with a value indicating that the corresponding point does not exist, is performed.

In the error map M in FIG. 4, the right side has a positive error, the central part does not have an error, the left side has a negative error. That is, it is indicated that the image G2c is displaced in a counterclockwise direction with respect to the image G1c.

Figure 5:
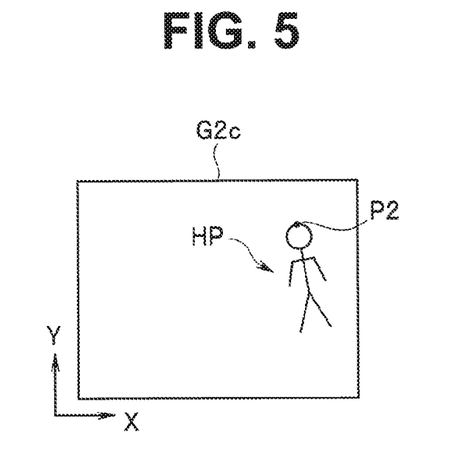
FIG. 5 is a diagram illustrating an example of an image obtained by rotating an image counterclockwise according to the embodiment.

FIG. 5 is a diagram illustrating an example of the image G2c which is displaced in a counterclockwise direction. In order to explain displacement of the image, it is exaggerated in FIG. 5 that a person HP in the image G2c is displaced around the center point of the image G2c.

While not illustrated, in the case where the image G2c is displaced in a clockwise direction with respect to the image G1c, in the error map EM, the right side has a negative error, the central part does not have an error, and the left side has a positive error.

Note that, in the case where the matching unit 14 outputs information indicating a certainty factor of matching when the matching unit 14 calculates the degree of matching, the value of the y disparity yp may be multiplied by the certainty factor of matching as a weight coefficient to correct the y disparity yp.

Figure 6:
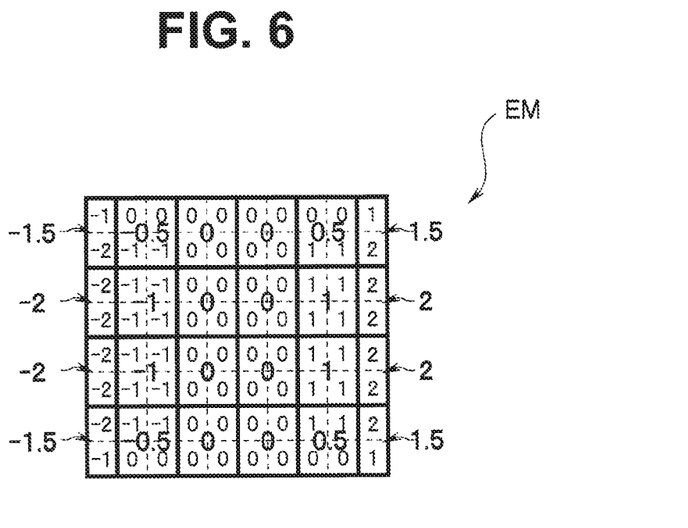
FIG. 6 is a diagram illustrating an example of an error map indicating a displacement amount for each block region according to the embodiment.

FIG. 6 illustrates an example of the error map indicating the displacement amount for each block region. The error map EM in FIG. 6 indicates a case where the error map M in FIG. 4 is divided into 4×6 block regions.

In the case of the error map EM in FIG. 6, the error map M in FIG. 4 is divided into 24 block regions, an average value of the y disparity yp included in each block region is calculated, and the calculated average value is used as the value of the y disparity yp of the block region. In FIG. 6, bold number indicates the y disparity yp of each block region. That is, the displacement amount is a statistical value (here, an average value) of the displacement amount for each pixel within a plurality of divided block regions in each image.

Note that, while the y disparity yp of each block region is an average value of the y disparity yp of a plurality of pixels included in each block region here, other statistical amounts may be used.

Still further, each block region may be weighted. For example, weighting may be performed such that weight is made larger for a block region closer to the peripheral part of the image, and weight of a block region closer to the central part of the image is made smaller.

The error map EM is supplied to the parallelization parameter error determining unit 16 and the parameter correcting unit 17. The error map EM is information indicating distribution of the displacement amount of two images in a direction orthogonal to the search line. Note that the error map creating unit 15 may output the error map M as is to the parallelization parameter error determining unit 16 and the parameter correcting unit 17 without creating the error map EM.

As describe above, the error map creating unit 15 constitutes the displacement amount information creating unit which creates the displacement amount information indicating the displacement amount of the two images in the direction orthogonal to the search line.

The parallelization parameter error determining unit 16 is a circuit which determines whether or not a parallelization error occurs based on the error map EM.

Here, a case where the error map EM is input will be described. The parallelization parameter error determining unit 16 determines whether or not a parallelization error occurs based on a predetermined threshold TH. The threshold TH is, for example, the number of extra lines searched in a positive direction or in a negative direction. The parallelization parameter error determining unit 16 calculates an average value of the y disparity yp by dividing a sum of the y disparity yp of all the block regions by the number of block regions and determines whether or not an absolute value of the average value of the y disparity yp is equal to greater than the threshold TH.

Note that whether or not a parallelization error occurs may be determined based on whether or not there are a plurality of block regions, y disparity yp of which is equal to or greater than the threshold TH, whether or not there are a plurality of block regions, disparity yp of which is equal to or greater than the threshold TH only for block regions in the peripheral part, or whether or not there are a plurality of block regions, disparity yp of which is equal to or greater than the threshold TH only for block regions of four corners of the image.

As described above, the parallelization parameter error determining unit 16 constitutes a rectification error determining unit which determines whether or not there is an error in rectification which parallelizes two images based on the error map EM.

The parallelization parameter error determining unit 16 outputs a correction instruction signal CS to the parameter correcting unit 17 when it is determined that a parallelization error occurs.

Further, the parallelization parameter error determining unit 16 writes the error map EM in the storage unit 18 when it is determined that a parallelization error occurs. Therefore, in the storage unit 18, a plurality of error maps EM when it is determined that a parallelization error occurs are stored.

Note that, when it is determined that a parallelization error occurs, as indicated with chain double-dashed line in FIG. 1, the parallelization parameter error determining unit 16 may notify a user through display of a message at the display unit 19 of liquid crystal display equipment, or the like, different from the image processing apparatus 1.

When the parameter correcting unit 17 receives the correction instruction signal CS, the parameter correcting unit 17 generates a correction signal for correcting the parallelization parameter information PP using the error map EM and outputs the correction signal to the rectification unit 13. The rectification unit 13 updates the parallelization parameter information PP based on the correction signal. The correction signal is a signal for correcting parallelization with respect to at least on image of the two images based on the error map EM.

Note that, while the parameter correcting unit 17 outputs the correction signal to the rectification unit 13 here, the corrected parallelization parameter information PP may be written in the rectification unit 13.

Further, the parameter correcting unit 17 may update the parallelization parameter information PP using information of the past error map EM stored in the storage unit 18 in addition to the error map EM.

By also using the past error map EM, it is possible to prevent the parallelization parameter information PP from being corrected by a large error such as instantaneous noise. For example, the parallelization parameter information PP is updated using an average value of the past (for example, previous) error map EM and the error map EM from the error map creating unit 15.

Still further, the past error map EM may be smoothed by obtaining a time average of a plurality of error maps EM stored in the storage unit 18.

Further, a plurality of error maps EM and correction information in accordance with the error maps EM are registered and stored in advance in the storage unit 18. The parameter correcting unit 17 may then extract registered error map information which matches or is similar to the error map EM from the error map creating unit 15 and update the parallelization parameter information PP using correction information corresponding to the extracted registered error map information. Note that extraction of the registered error map information may be comparison of values of errors or comparison of only signs of the values.

Still further, it is also possible to evaluate a degree of stability of the parallelization parameter information PP by utilizing information of the past error map EM and, when the parallelization parameter information PP is unstable, display that the parallelization parameter information PP is unstable at the display unit 19 to notify the user.

Here, updating of the parallelization parameter information PP will be described.

The parallelization parameter information PP is correction data for each block region for performing at least one of rotation and translational movement of one or both of the two images G1 and G2, and is data indicating the displacement amount in one or both of the images G1 and G2.

The parameter correcting unit 17 which receives the correction instruction signal CS updates the displacement amount in at least one of the two images G1 and G2 by adding the information of the error map EM received from the error map creating unit 15 to the parallelization parameter information PP.

Figure 7:
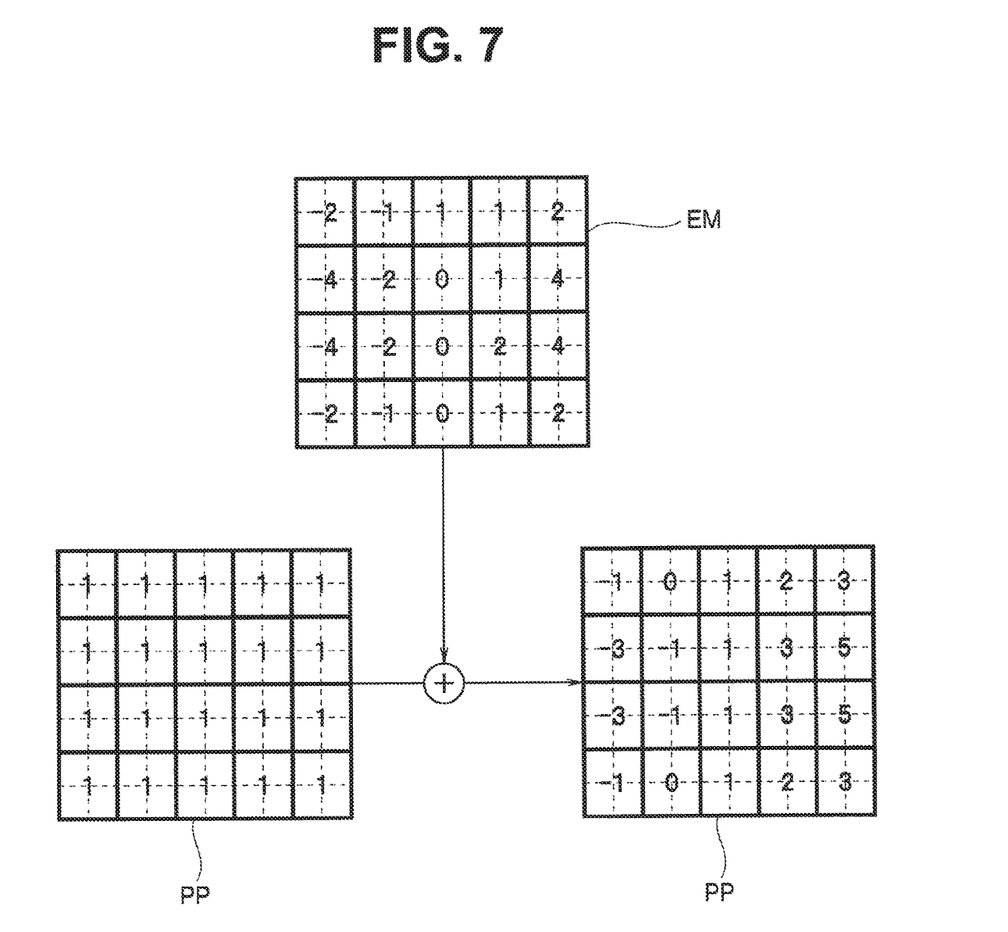
FIG. 7 is a diagram for explaining an example of updating processing of parallelization parameter information based on the error map according to the embodiment.

FIG. 7 is a diagram for explaining an example of updating processing of the parallelization parameter information based on the error map. Note that FIG. 7 illustrates an error map in the case of a plurality of block regions of 4×5 for simplicity.

The parallelization parameter information PP in FIG. 7 is the displacement amount for each block region of one of the images G1 and G2 with respect to the other image. There is a case where the parallelization parameter information PP may be displaced from a correct value due to temperature characteristics, vibration characteristics, or the like, of a jig, or the like, of the adjusting apparatus, aging degradation of a stereo camera, or the like. Therefore, in FIG. 7, the displacement amount is adjusted to a correct value by adding the error map EM to the parallelization parameter information PP for each block region.

Figure 8:
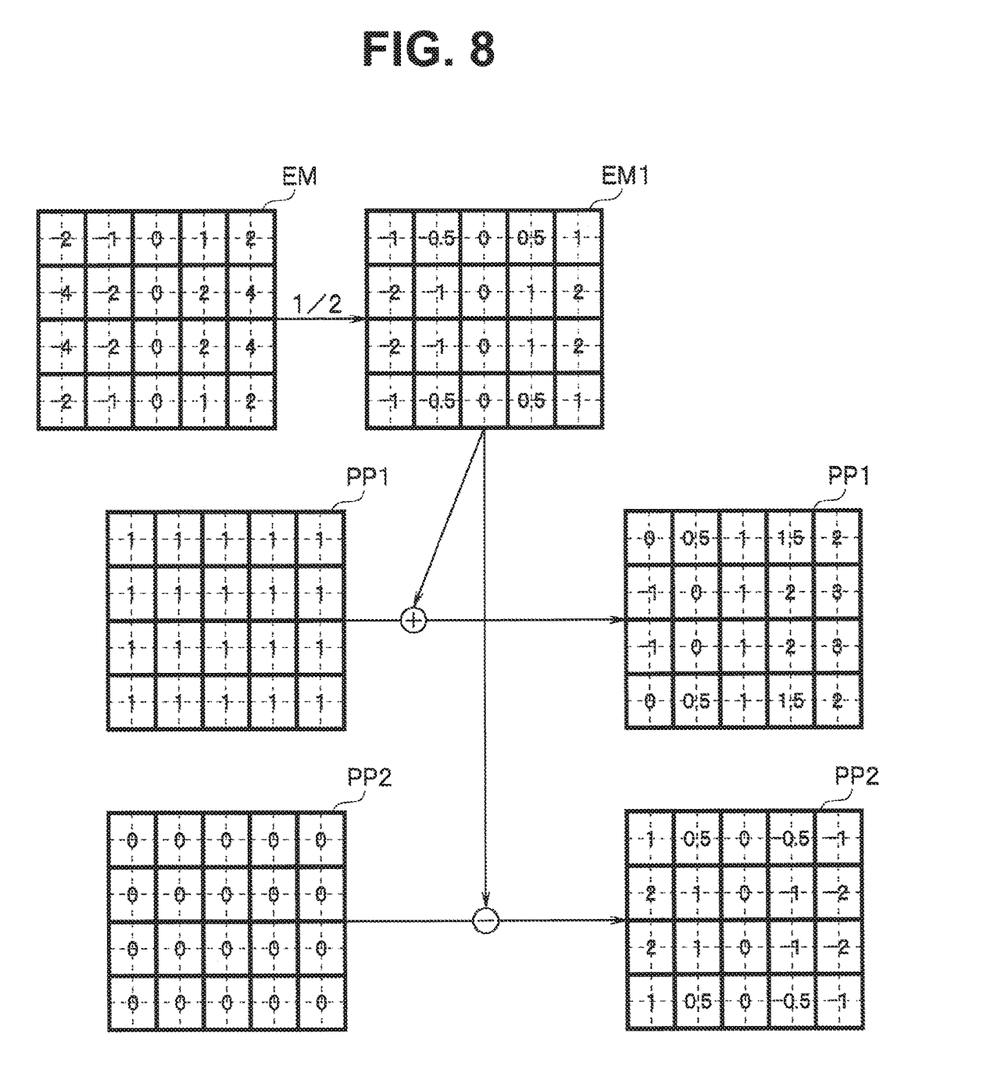
FIG. 8 is a diagram for explaining another example of the updating processing of the parallelization parameter information based on the error map according to the embodiment.

FIG. 8 is a diagram for explaining another example of the updating processing of the parallelization parameter information based on the error map. The parallelization parameter information PP in FIG. 8 is the displacement amount for each block region of both of the images G1 and G2. Parallelization parameter information PP1 for the image G1 and parallelization parameter information PP2 for the image G2 are determined upon manufacturing of the stereo camera.

Therefore, in FIG. 8, an error map EM1 obtained by reducing the value of each block region in the error map EM by ½ is generated. Then, the error map EM1 is added to parallelization parameter information PP1, and the error map EM1 is subtracted from parallelization parameter information PP2 for the image G2, so that the displacement amount is adjusted to a correct value.

Note that, while the parameter correcting unit 17 updates the parallelization parameter information PP using the error map EM here, the parallelization parameter information PP may be updated while taking into account the past error map EMp.

For example, a ratio of addition/subtraction with respect to the displacement amount for each block region of the images G1 and G2 may be adjusted to ⅓ and ⅔, ¼ and ¾, or the like, so that change of each value in the error map EM converges and approaches zero from trend of the past error map Emp.

(Effects)

According to the embodiment, it is possible to provide an image processing apparatus and an image processing method in which processing load of determining whether or not there is a parameter error for rectification or correcting a parameter error is smaller than the related art.

According to the image processing apparatus of the embodiment, because the processing load is small, it is also possible to dynamically perform calibration online, that is, during operation of the stereo camera system. Further, a circuit size of the image processing apparatus becomes small.

Further, because the error map M is created using the y disparity yp calculated in the stereo matching processing, processing load of creating the error map is low.

Still further, the parallelization parameter error determining unit 16 determines whether or not an error of parallelization occurs based on the error map EM. The parameter correcting unit 17 corrects the parameter only when it is determined that a parallelization error occurs, and does not always execute parameter correction processing. Therefore, it is possible to provide an effect of allowing resource to be utilized by other application as well as reduce power consumption.

Note that, while each block of the image processing apparatus 1 in FIG. 1 is a hardware circuit, a function of each block may be implemented with a software program by utilizing a central processing unit (that is, a CPU), a ROM and a RAM. In this case, programs corresponding to functions of respective blocks of the rectification unit, the matching unit, the error map creating unit, the parallelization parameter error determining unit and the parameter correcting unit are stored in the ROM, and the function corresponding to each block is implemented by the CPU reading each program from the ROM, developing the program in the RAM and executing the program.

Modifications of the embodiment will be described next.

(Modification 1)

As modification 1, it is also possible to employ a configuration where the image processing apparatus 1 does not have the parallelization parameter error determining unit 16, and the parameter correcting unit 17 always or periodically corrects the parameter based on the error map EM1. In this case, the image processing apparatus 1 can perform error correction processing of the rectification parameter for each frame from the cameras 11 and 12.

(Modification 2)

As modification 2, it is also possible to employ a configuration where the image processing apparatus 1 does not have the parameter correcting unit 17 and only has the parallelization parameter error determining unit 16, so that abnormality of the parameter can be detected.

(Modification 3)

As modification 3, it is also possible to employ a configuration where the y disparity yp in a portion of a predetermined ratio including the central part of each image is calculated, or the y disparity yp in a portion of a peripheral region of each image is calculated.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. An image processing apparatus comprising:
 a rectification circuit configured to parallelize a first image and a second image based on parameter information for performing at least one of rotation and parallel movement on one or both of the first image and the second image;
 a matching circuit configured to calculate and output y disparity by performing stereo matching processing on the first image and the second image outputted from the rectification circuit, the stereo matching processing being performed by calculating a degree of matching of each pixel in the first image while moving a window of a predetermined size in an X direction in the second image, and when the movement in the X direction is finished, changing from a line to a next line and moving the window in the X direction;
 a displacement amount information creating circuit configured to create, by using the y disparity, displacement amount information of the images in a direction orthogonal to a search line for the first and second images subjected to the stereo matching processing; and
 a rectification error determining circuit configured to determine whether or not there is an error of rectification which parallelizes the first and second images in the rectification circuit, based on the displacement amount information.

2. The image processing apparatus according to claim 1, further comprising:
 a parameter correcting circuit configured to generate a correction signal for correcting the error of the rectification based on the displacement amount information.

3. The image processing apparatus according to claim 1, further comprising:
 a parameter correcting circuit configured to correct a parameter of a rectification circuit which parallelizes the images, based on the displacement amount information.

4. An image processing method comprising:
 performing rectification for parallelizing a first image and a second image obtained through imaging using cameras, based on parameter information for performing at least one of rotation and parallel movement on one or both of the first and second images;
 calculating y disparity by performing stereo matching processing on the first and second images subjected to the rectification, the stereo matching processing being performed by calculating a degree of matching of each pixel in the first image while moving a window of a predetermined size in an X direction in the second image, and when the movement in the X direction is finished, changing from a line to a next line and moving the window in the X direction;
 creating, by using the y disparity, displacement amount information between the images in a direction orthogonal to a search line for the first and second images obtained through the stereo matching processing; and
 determining whether or not there is an error of rectification which parallelizes the first and second images in the rectification, based on the displacement amount information.

5. The image processing method according to claim 4, further comprising:
 generating a correction signal for correcting the error of the rectification based on the displacement amount information.

6. The image processing method according to claim 4, further comprising:
 parallelizing the first and second images.

7. The image processing method according to claim 4, further comprising:
 correcting a parameter of a rectification circuit which parallelizes the first and second images, based on the displacement amount information.

8. The image processing apparatus according to claim 1, wherein the matching circuit is further configured to calculate and output x disparity, and wherein the displacement amount information creating circuit is configured to create, as the displacement amount information, an error map created by disposing data of the y disparity at a pixel position of the x disparity.

9. The image processing method according to claim 4, further comprising:
 performing the stereo matching processing to calculate x disparity, wherein the displacement amount information includes an error map created by disposing data of the y disparity at a pixel position of the x disparity.

* * * * *